Patented Nov. 20, 1945

2,389,126

UNITED STATES PATENT OFFICE 2,389,126

THERAPEUTICALLY USEFUL SULPHONES AND THEIR PREPARATION

Louis L. Bambas, Grosse Pointe Woods, Mich., assignor to Parke, Davis & Company, Detroit, Mich., a corporation of Michigan No Drawing. Application June 13, 1944,
Serial No. 540,135

9 Claims. (Cl. 260—239.6)

The invention relates to the preparation of therapeutically useful sulphones, and more especially to sulphones in which a substituted aryl radical and a heterocyclic radical are united to the sulphone grouping.

This application is a continuation-in-part of my copending application, Serial No. 422,904, filed December 13, 1941.

The present application relates more particularly to the compounds having the following general formula

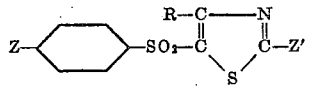

where R is a member of the class consisting of hydrogen or alkyl and Z and Z' are members of the class consisting of —NO₂, —NH₂ and groups hydrolyzable to —NH₂ such as acylamino and

where R₁ and R₂ are H, alkyl or acyl. These compounds are useful for the treatment of bacterial infections and some are of outstanding therapeutic importance.

The present application also relates to the methods for manufacturing said class of sulphones, which methods are also applicable to the manufacture of other sulphones in which the substituents united to the sulphone grouping may vary more widely than represented in the above formula. The methods of this application are furthermore useful in the manufacture of intermediate compounds which in themselves are of importance.

In my application No. 540,138, filed concurrently herewith, I have described a method for preparing organic sulphides having the formula

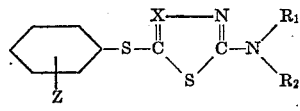

when Z is H, Cl, Br, NO₂, NHAc, X is

≡CH, ≡C—CH₃ or ≡N and R₁ and R₂ are H, alkyl,

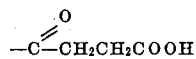

This method is based on the discovery that when a benzene sulphenyl halide is reacted with a 2-aminothiazole or a 2-amino thiodiazole and the reaction product is subjected to heat in the presence of acetic anhydride or other equivalent agent, a rearrangement takes place which may be illustrated as follows:

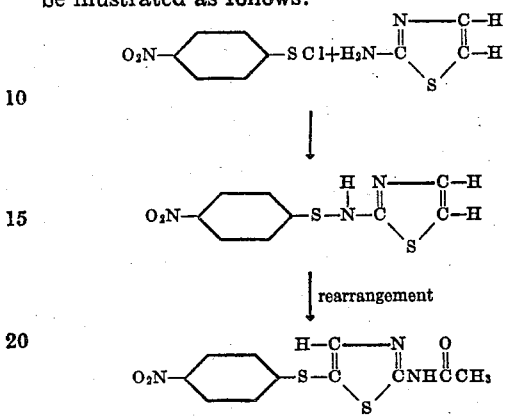

The present application relates to the preparation of the sulphones corresponding to the sulphides above mentioned and the further conversion of said sulphones into derivatives in which the substituents in the aryl and heterocyclic portions are further modified from those in the sulphide starting materials.

For example, compounds prepared by means of this invention which have amino groups at 2 and 4' have in many cases outstanding therapeutic activity for the treatment of pneumococcal and streptococcal infections.

My invention may be illustrated by the following typical examples.

*Example 1(a).—Preparation of 2-acetylamino-4'-nitro-5-thiazolylphenyl sulphide*

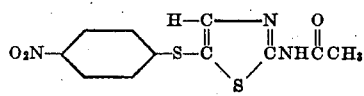

p-Nitrobenzene sulphenyl chloride may be prepared from 4,4'-dinitro diphenyl sulphide by the method of T. Zincke and S. Lenhardt, Ann. 400, 2, (1913).

1430 grams of 2-aminothiazole is dissolved in one gallon of glacial acetic acid. This solution is cooled (20–40° C.) while a solution of 1400 grams of p-nitrophenyl sulphenyl chloride dissolved in 1 gallon of glacial acetic acid is added. Subsequently 1500 cc. of acetic anhydride is added and the solution is kept at a temperature of 85–90° C. for 24 hours to complete the rearrangement. A precipitate forms which is filtered off and then recrystallized from dioxane to give pure 2-acetylamino-4'-nitro-5-thiazolylphenyl sulphide of melting point 273–275° C.

In the above process the initial reaction forms the intermediate compound 4-nitro-phenyl-sulphen-2'-aminothiazole which, however, is not isolated. Heat is necessary to cause its rearrangement to 2-amino-4'-nitro-5-thiazolylphenyl sulphide. The optimum temperature is about 85–90° C. at which about 80% of the rearrangement takes place in two hours. At lower temperatures, the rearrangement requires a longer time. At higher temperatures slight decomposition of the reaction product takes place, which however may not be wholly objectionable.

Acetic anhydride, while unnecessary to produce some rearrangement and the formation of the free amino compound (2-amino-4'-nitro-5-thiazolylphenyl sulphide), is nevertheless desirable since it performs several functions in the rearrangement. It catalyzes the reaction according to the concentration of acetic anhydride present. The reaction is very rapid in the presence of acetic anhydride alone. The acetic anhydride also serves to acylate the free amino compound and the acylated compound is precipitated out of solution and therefore is readily separated from the other reactants. This precipitation serves as an indicator as to the course of the reaction. Acylation of the amine is also desirable when the compound is to be used as an intermediate for forming derivatives by a subsequent reaction where amino groups must be protected as in the oxidation of the sulphide to a sulphone as hereinafter described.

Instead of using acetic anhydride, other anhydrides may be used such as propionic anhydride or succinic anhydride or other acylating agents.

Instead of using glacial acetic acid as the solvent for the reactants, many other solvents may be used such, for example, as choloroform, ether, trichlorethylene or ethylene dichloride. The solvent may then be evaporated off and the anhydride added for the rearrangement or the anhydride may be added to the reaction mixture in the solvent for the rearrangement step.

If desired, a reagent may be added to take up the hydrogen chloride liberated in the reaction. Pyridine, triethylamine or sodium acetate may be used for this purpose but I have found it preferable to use merely an excess of 2-aminothiazole.

Where the compound formed in the reaction is to be subsequently oxidized to the corresponding sulphone, it is not necessary that it be purified by recrystallization. Preferably, however, the reaction mixture is stirred during the heating step since this facilitates a small crystal structure which is easier to oxidize. The reaction mixture is then either filtered directly or diluted with hot water and then filtered. The filter cake may be washed with hot alcohol. The crude material is obtained in high yields and although it may melt 20–25° lower than pure 2-acetylamino-4'-nitro-5-thiazolylphenyl sulphide, it is entirely satisfactory for oxidation to the corresponding sulphone.

*Example 1(b).—Preparation of 2-acetylamino-4'-nitro-5-thiazolylphenyl sulphone*

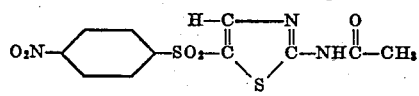

700 grams of crude 2-acetylamino-4'-nitro-5-thiazolylphenyl sulphide obtained as in Example 1(a) is suspended in a solution of 1700 cc. acetic anhydride in 6000 cc. glacial acetic acid. 1750 cc. concentrated hydrogen peroxide (30%) is added while cooling to keep the temperature below 90° C. The suspension goes into solution and then is recrystallized as formed. After the reaction is complete the mixture is allowed to stand at 80–90° C. for 2 hours, then cooled and filtered. The product thus obtained is 2-acetylamino-4'-nitro-5-thiazolylphenyl sulphone having a melting point 274–276° C. In this step the volumes and concentrations of reagents and solvents are not critical but the temperature must be controlled to avoid loss of product. Other oxidizing agents may be used such, for example, as a dilute solution of chromic acid in glacial acetic acid.

*Example 1(c).—Preparation of 2-amino-4'-nitro-5-thiazolylphenyl sulphone*

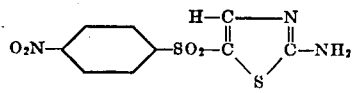

The compound from Example 1(b) may be deacetylated as follows. 620 grams of the acetyl compound is suspended in a solution of 1 gallon of glacial acetic acid in 500 cc. hydrochloric acid and 500 cc. water. The mixture is refluxed until complete solution and then 30 minutes longer. The solution is cooled, neutralized to Congo red with dilute alkali and diluted still further. The precipitate of 2-amino-4'-nitro-5-thiazolyl sulphone is filtered off and has a melting point of 230–232° C. The deacetylation may be run in various solvents such as dioxane, Cellosolve, ethanol, etc., and other acids such as dilute sulphuric may be used.

*Example 1(d).—Preparation of 2,4'-diamino-5-thiazolylphenyl sulphone*

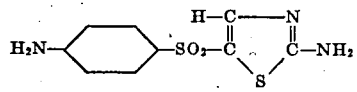

100 grams of ammonium chloride is dissolved in 10 liters of hot water and 600 grams of reduced iron added with stirring. The suspension is heated at 90–100° C. for 30 minutes and then cooled to 70° C. 460 grams of 2-amino-4'-nitro-5-thiazolylphenyl sulphone is added with stirring and cooling so that the temperature does not rise above 80–85° C. The temperature is maintained at 80° C. for 2 hours, then cooled and the supernatant liquid decanted off. The sludge is made alkaline and then extracted with hot acetone and filtered. The acetone is removed, the residue cooled and the crystals are filtered off and dried. The product is recrystallized from a hot charcoaled solution in absolute alcohol to give 2,4'-diamino-5-thiazolylphenyl sulphone of melting point 218–220° C. The reduction may be carried out with iron filings, ground cast iron or iron chips in place of reduced iron. Dilute hydrochloric acid, dilute acetic acid or calcium chloride may be used instead of ammonium chloride. The reduction may also be accomplished catalytically with Raney nickel, ammonium polysulphide or titanium chloride.

*Example 2.—Preparation of 2-acetylamino-4'-amino-5-thiazolylphenyl sulphone*

In Examples 1(c) and 1(d) the 2-acetylamino-4'-nitro-5-thiazolylphenyl sulphone of Example 1(b) is first deacetylated and then reduced, but these reactions may be reversed and the compound first reduced and then deacetylated. Reduction of 2-acetylamino-4'-nitro-5-thiazolylphenyl sulphone may be accomplished in a manner similar to Example 1(d) and results in the formation of 2-acetylamino-4'-amino-5-thiazolylphenyl sulphone of melting point 267-269° C. It has the formula

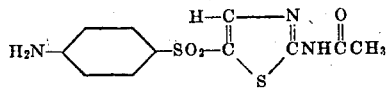

This compound may then be deacetylated to give 2,4'-diamino-5-thiazolylphenyl sulphone of Example 1(d).

*Example 3(a).—Preparation of 2-succinylamino-4'-nitro-5-thiazolylphenyl sulphone*

By following the directions of Example 1(a) using succinic anhydride instead of acetic anhydride for the rearrangement, the compound 2-succinylamino-4'-nitro-5-thiazolylphenyl sulphide is prepared and oxidized as in Example 1(b) to the corresponding sulphone. The same sulphone compound may be obtained from 2-amino-4'-nitro-5-thiazolylphenyl sulphone of Example 1(c) by suspending 80 grams in 500 cc. of glacial acetic acid and adding 100 grams of succinic anhydride while warming the mixture. The succinyl derivative precipitates as fast as it is formed. After 30 minutes, the solution is cooled and the precipitate is filtered off. The compound sublimes on heating.

*Example 3(b).—Preparation of 2-succinylamino-4'-amino-5-thiazolylphenyl sulphone*

2-succinylamino-4'-nitro-5-thiazolylphenyl sulphone is reduced as in Example 1(d) with iron and dilute ammonium chloride to give 2-succinylamino-4'-amino-5-thiazolylphenyl sulphone of melting point 228-230° C. The formula of this compound is:

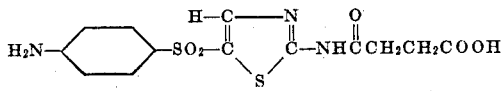

*Example 4.—Preparation of 2-crotonylamino-4'-amino-5-thiazolylphenyl sulphone*

In the same manner as in Example 3 except using crotonic anhydride, the compound 2-crotonylamino-4'-amino-5-thiazolylphenyl sulphone of melting point 258-260° C. is obtained. It has the formula

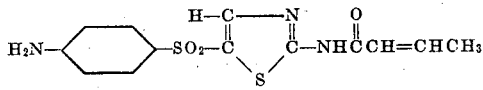

In a similar manner other acylated derivatives may be prepared by using the appropriate anhydride as the acylating agent. The acylated derivatives are soluble in alkalies and may be obtained in the form of their alkali metal salts.

*Example 5(a).—Preparation of 2-acetyl methylamino-4-methyl-4'-nitro-5-thiazolylphenyl sulphide*

2-methylamino-4-methyl thiazole is made according to Traumann, Ann 249, 43 and Young and Crooks, Jr., Chem. Soc. 89 68.

To a solution of 315 grams of 2-methylamino-4-methyl thiazole in 1 liter of glacial acetate acid is added the p-nitro benzene sulphenyl chloride from 190 grams of 4,4'-dinitro diphenyl disulphide. The solution warms up and 300 cc. of acetic anhydride is added. The reaction is heated on a steam bath to 85-90° C. for 15 hours. Crystals begin to precipitate out of solution in ½ hour. The solution is cooled and the precipitate is filtered off and washed with ethanol. The filter cake is recrystallized from hot dioxane to give 300 grams of 2-acetyl-methylamino-4-methyl-4'-nitro-5-thiazolylphenyl sulphide of M. P. 188-190° C.

*Example 5(b).—Preparation of 2-acetyl methylamino-4-methyl-4'-nitro-5-thiazolylphenyl sulphone*

The 300 grams of the sulphide from Example 5(a) is suspended in 2500 cc. of glacial acetic acid. 350 cc. of (30%) hydrogen peroxide is gradually added to the glacial acetic acid suspension keeping the temperature at 85-90° C. with heating and cooling. The suspension gradually goes into solution and finally precipitates out of solution. After all the hydrogen peroxide is added, the reaction is kept at 85-90° for a half hour. The reaction mixture is then cooled and the precipitate is filtered off to give 300 grams of 2-acetyl methylamino-4-methyl-4'-nitro-5-thiazolylphenyl sulphone of M. P. 228°-229° C.

*Example 5(c).—Preparation of 2-methylamino-4-methyl-4'-nitro-5-thiazolylphenyl sulphone*

The 300 grams of the product of Example 5(b) is deacetylated by suspending this material in 1700 cc. of glacial acetic acid, 300 cc. of concentrated hydrochloric acid, and 300 cc. of water and refluxing for 3 hours. The suspension turns from a light yellow to a yellowish orange. The precipitate is filtered off and suspended in hot water to hydrolyze the hydrochloride. The suspension becomes a bright yellowish orange and is filtered off to give 230 grams of 2-methylamino-4-methyl-4'-nitro-5-thiazolylphenyl sulphone of M. P. 240-242° C.

*Example 5(d).—Preparation of 2-methylamino-4-methyl-4'-amino-5-thiazolylphenyl sulphone*

The produce from Example 5(c) is reduced by suspending 230 grams of the dry material in a suspension of 300 grams of reduced iron in 30 grams of ammonium chloride in 2 liters of water. The reaction is stirred vigorously while the temperature is maintained at 80-85° C. for 3 hours. The reaction is cooled and the solution is decanted from the iron sludge. The sludge is made alkaline to litmus with dilute sodium hydroxide. The sludge is extracted with an equal volume of hot acetone. The acetone is removed from the acetone solution and the precipitate is dissolved in 2 liters of hot 80% ethanol and charcoaled. The solution is cooled and the crystals of 2-methylamino-4-methyl-4'-amino-5-thiazolylphenyl sulphone of M. P. 220-222° C. are filtered off.

*Example 6 (a).—Preparation of 2-acetylamino-4-methyl-4'-nitro-5-thiazolylphenyl sulphide*

2-amino-4-methyl thiazole is prepared according to Blatt-Organic Synthesis Collective, vol. II, page 31. To a solution of 315 grams of this compound in 1 liter of glacial acetic acid is added 1400 grams of p-nitro benzene sulphenyl chloride, as in Example 1(a). The intermediate reaction product is not isolated but it is rearranged by heat in the presence of an anhydride, e. g. 300 cc. of acetic anhydride. The reaction mixture is heated on a steam bath to 85-90° C. for 15 hours. Crystals begin to appear in 30 minutes. The solution is cooled and the precipitate filtered off and washed with ethanol. The filter cake is recrystallized from hot dioxane to give 300 grams of 2-acetylamino-4-methyl-4'-nitro-5-thiazolylphenyl sulphide of melting point 174–177° C. It has the formula

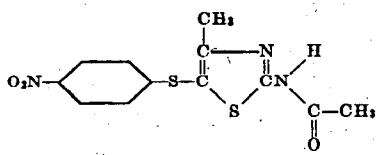

*Example 6(b).—Preparation of 2-acetylamino-4-methyl-4'-nitro-5-thiazolylphenyl sulphone*

The 300 grams of the sulphide from Example 6(a) is suspended in 2500 cc. of glacial acetic acid. 350 cc. of (30%) hydrogen peroxide is gradually added to the glacial acetic acid suspension keeping the temperature at 85–90° C. with heating and cooling. The suspension gradually goes into solution and finally precipitates out of solution. After all the hydrogen peroxide is added, the reaction is kept at 85–90° C. for a half hour. The reaction mixture is then cooled and the precipitate is filtered off to give 300 grams of 2-acetylamino-4-methyl-4'-nitro-5-thiazolylphenyl sulphone.

*Example 6(c).—Preparation of 2-amino-4-methyl-4'-nitro-5-thiazolylphenyl sulphone*

The 300 grams of the product of Example 6(b) is deacetylated by suspending this material in 1700 cc. of glacial acetic acid, 300 cc. of concentrated hydrochloric acid, and 300 cc. of water and refluxing for 3 hours. The suspension turns from a light yellow to a yellowish orange. The precipitate is filtered off and suspended in hot water to hydrolyze the hydrochloride. The suspension becomes a bright yellowish orange and is filtered off to give 230 grams of 2-amino-4-methyl-4'-nitro-5-thiazolylphenyl sulphone.

*Example 6(d).—Preparation of 2,4-diamino-4-methyl-5-thiazolylphenyl sulphone*

The product from Example 6(c) is reduced by suspending 230 grams of the dry material in a suspension of 300 grams of reduced iron in 30 grams of ammonium chloride in 2 liters of water. The reaction is stirred vigorously while the temperature is maintained at 80–85° C. for 3 hours. The reaction is cooled and the solution is decanted from the iron sludge. The sludge is made alkaline to litmus with dilute sodium hydroxide. The sludge is extracted with an equal volume of hot acetone. The acetone is removed from the acetone solution and the precipitate is dissolved in 2 liters of hot 80% ethanol and charcoaled. The solution is cooled and the crystals of 2,4'-diamino-4-methyl-5-thiazolylphenyl sulphone of M. P. 175–178° C. are filtered off.

*Example 7.—Preparation of 2,4'-diamino-4-amyl-5-thiazolylphenyl sulphone*

2-amino-4-amyl-thiazole is prepared according to Ziegler, J. A. C. S. 63, 2946 (1941). This thiazole compound is treated in the same manner as set forth in Examples 6(a) to 6(d) thereby obtaining 2,4'-diamino-4-amyl-5-thiazolylphenyl sulphone.

*Example 8.—Preparation of 2-dimethylamino-4'-amino-4-methyl-5-thiazolylphenyl sulphone*

2-dimethylamino-4-methyl-thiazole is prepared from N,N-dimethyl thiourea and chloroacetone. It is then treated in the same manner as set forth in Examples 5(a) to 5(d) thereby obtaining 2-dimethylamino-4'-amino-4-methyl- 5-thiazolylphenyl sulphone.

*Example 9(a).—Preparation of 2-acetylamino-4'-nitro-5-thiodiazolylphenyl sulphide*

This compound may be prepared in the same manner as in Example 1(a) by substituting 2-amino-thiodiazole for 2-amino thiazole. 2-amino thiodiazole is reacted with p-nitro phenyl sulphenyl chloride in glacial acetic acid and acetic anhydride and the solution kept at 85–90° C. for 24 hours. 2-acetylamino-4'-nitro-5-thiodiazolyl phenyl sulphide is precipitated.

*Example 9(b).—Preparation of 2-acetylamino-4'-nitro-5-thiodiazolyl phenyl sulphone*

The product obtained from Example 9(a) is oxidized with hydrogen peroxide in the same manner as Example 1(b) thereby obtaining 2-acetylamino-4'-nitro-5-thiodiazolyl phenyl sulphone of M. P. 250–254° C.

*Example 9(c).—Preparation of 2-amino-4'-nitro-5-thiodiazolyl phenyl sulphone*

The product of Example 9(b) is deacetylated as in Example 1(c) to give 2-amino-4'-nitro-5-thiodiazolyl phenyl sulphone of M. P. 228–232° C.

*Example 9(d).—Preparation of 2,4'-diamino-5-thiodiazolyl phenyl sulphone*

The product from Example 9(c) is treated as in Example 1(d) to reduce the nitro group to an amino group thereby obtaining 2,4'-diamino-5-thiodiazolyl phenyl sulphone of M. P. 233–236° C.

What I claim as my invention is:

1. A compound having the formula

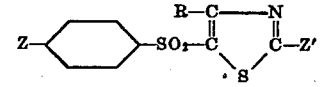

where R is a member of the class consisting of hydrogen and alkyl and Z and Z' are members of the class consisting of $NO_2$, $NH_2$,

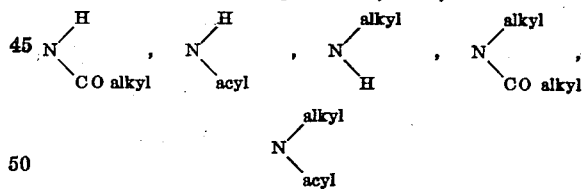

2. A compound having the formula

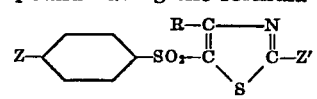

where R is a member of the class consisting of hydrogen and alkyl and Z and Z' are $NH_2$.

3. 2,4'-diamino-5-thioazolylphenyl sulphone.

4. Process for preparing a sulphone which comprises oxidizing a sulphide compound having the formula

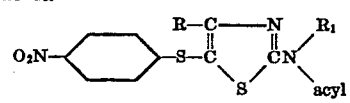

where R and $R_1$ are members of the class consisting of H and alkyl to obtain the corresponding sulphone having the formula

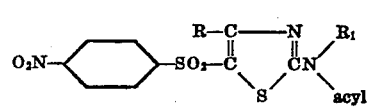

5. Process for preparing a sulphone which comprises oxidizing a sulphide compound having the formula

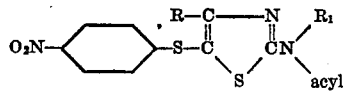

where R and R₁ are members of the class consisting of H and alkyl to obtain the corresponding sulphone having the formula

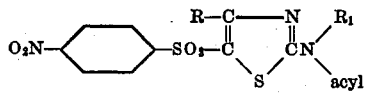

and in either order reducing the nitro group and deacylating the acyl group thereby obtaining a compound having the formula

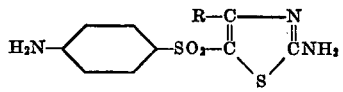

6. Process for preparing a sulphone which comprises oxidizing a sulphide compound having the formula

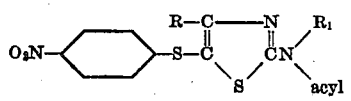

where R and R₁ are members of the class consisting of H and alkyl to obtain the corresponding sulphone having the formula

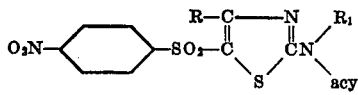

treating the latter compound with a deacylating agent to obtain a compound having the formula

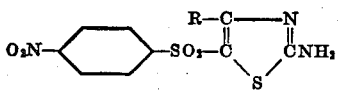

and reducing the latter to obtain a compound having the formula

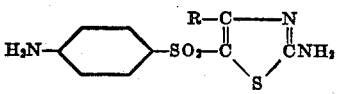

7. Process for preparing a sulphone which comprises oxidizing a sulphide compound having the formula

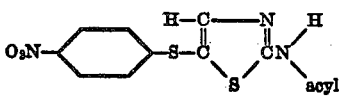

to obtain the corresponding sulphone having the formula

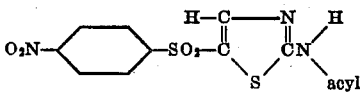

8. Process for preparing a sulphone which comprises oxidizing a sulphide compound having the formula

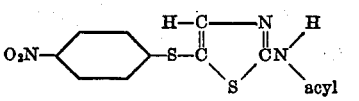

to obtain the corresponding sulphone having the formula

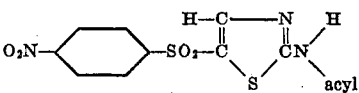

and in either order reducing the nitro group and deacylating the acyl group thereby obtaining a compound having the formula

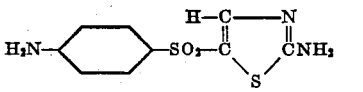

9. Process for preparing a sulphone which comprises oxidizing a sulphide compound having the formula

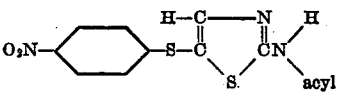

to obtain the corresponding sulphone having the formula

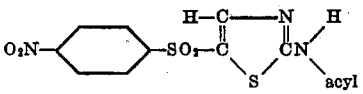

treating the latter compound with a deacylating agent and subsequently reducing the nitro group to obtain a compound having the formula

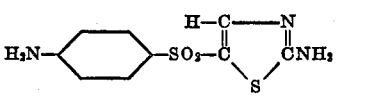

LOUIS L. BAMBAS.